United States Patent Office 3,477,911
Patented Nov. 11, 1969

3,477,911
METHOD OF PRODUCTION OF UROKINASE
Nathan H. Sloane, Germantown, Tenn., assignor to Century Laboratories, Inc., a corporation of Delaware
No Drawing. Continuation-in-part of application Ser. No. 586,968, Oct. 17, 1966. This application Mar. 22, 1967, Ser. No. 625,019
Int. Cl. C12d; C07g 7/02
U.S. Cl. 195—66                                6 Claims

ABSTRACT OF THE DISCLOSURE

A crude urokinase precipitate is obtained by adding tannic acid to urine. This crude precipitate contains various proteinaceous materials, including the urokinase. It has now been found that the urokinase can be separated from the other proteinaceous materials by dissolving the crude precipitate in a alkaline solution, dialayzing and adding thereto cold butyl alcohol. The urokinase remains in solution whereas the other proteinaceous material precipitates out on the surface of the solution in the form of a gel (after shaking) which can then be readily separated out and discarded. A dilute acid is then added to the urokinase solution in order to precipitate the urokinase. This precipitated urokinase is then solubilized by adding cold ethyl alcohol thereto and permitting the resulting mixture to remain at about room temperature for a sufficient amount of time until the urokinase is substantially solubilized. This alcoholic solution of urokinase is then separated from any insoluble material present and then dialyzed to reprecipitate the urokinase in a highly purified form. This purified urokinase may then be dissolved in a dilute alkaline solution and dialyzed to produce a highly concentrated urokinase solution.

CROSS REFERENCES TO RELATED APPLICATIONS

This application is a continuation-in-part of my copending application Ser. No. 586,968, filed Oct. 17, 1966.

BACKGROUND OF THE INVENTION

Field of the invention

This invention relates to a method for the purification of crude urokinase and in particular to a method wherein a crude urokinase-containing protein solution, obtained by the precipitation of urine with tannic acid, is purified and concentrated by means of a series of selective precipitation and solubilization steps. The urokinase obtained as a result of the selective separation steps is in a highly purified and concentrated form.

Description of prior art

Urokinase is an enzyme cofactor which stimulates the production in the blood of the clot-dissolving proteolytic enzyme, plasmin. Urokinase is, accordingly, used in the treatment of persons having various circulatory disorders such as those which tend to cause the formation of blood clots.

Human urine is an excellent source of urokinase particularly in view of the great quantity of urine which is available. Therefore, a method which utilizes urine as a source of urokinase is economically desirable.

Large volumes of urine are required to obtain sufficient amounts of urokinase. Therefore, it is desirable to have a method wherein a urokinase-rich fraction of comparatively small unit volume can be quickly and efficiently isolated therefrom. Heretofore, urokinase has ben obtained from urine by adsorption on benzoic acid. This adsorption process, however, requires a great number of cumbersome and inefficient steps for the purification of urokinase. Moreover, although tannic acid has been added to urine in order to precipitate the proteinaceous components thereof for purposes other than obtaining urokinase, I am aware of no method which has been proposed whereby urokinase is extracted from the tannic acid precipitate of urine.

A method for the tannic acid precipitation of urokinase from urine has been disclosed in my copending U.S. application Ser. No. 586,968, filed Oct. 17, 1966, of which this application is a continuation-in-part. Tannic acid is an effective urine precipitant, by means of which one can efficiently precipitate urokinase, in one step, from large quantities of urine. This precipitation step effectively reduces, immediately in the process, the great bulk of material that must be handled in further isolating pure urokinase. It provides a crude urokinase-containing protein concentrate which is rich in urokinase and comparatively small in unit volume. The efficiency provided thereby is an economically important factor in the manufacture of urokinase.

SUMMARY OF THE INVENTION

It is known from my copending application Ser. No. 586,968 that a crude urokinase concentrate can be produced by adding tannic acid to urine, collecting the resulting precipitate and dissolving it in a buffered alkaline solution and dialyzing. It has now been discovered that when cold butyl alcohol is added to such an alkaline solution of the crude urokinase concentrate and shaken, the urokinase remains in solution whereas the other proteinaceous materials, present in the crude urokinase concentrate, precipitate out on the surface of the solution in the form of a gel which can then be readily separated out and discarded. The remaining urokinase solution is in relatively purified form and may be utilized in the treatment of cardiovascular disturbances wherein it is desirable to stimulate the production in the blood, of the clot-dissolving proteolytic enzyme, plasmin.

It has further been discovered that when a dilute acid is added to the solution described above, the urokinase precipitates out. This precipitate is then dissolved in ethyl alcohol and then dialyzed to reprecipitate the urokinase in a highly purified form. This purified urokinase may then be dissolved in a dilute alkaline solution and dialyzed to produce a highly concentrated urokinase solution.

DESCRIPTION OF THE PREFERRED EMBODIMENTS

As described in my copending U.S. application Ser. No. 586,968, filed Oct. 17, 1966, the addition of tannic acid to urine results in the precipitation therefrom of a crude urokinase-containing protein concentrate. This precipitate may be separated from the urine by any suitable means such as centrifuging, decanting, filtering, etc. The precipitate is then suspended in a buffer solution to which is added a highly alkaline solution, such as sodium hydroxide. On the addition of the alkaline solution (which is not allowed to go above about pH 10) the precipitate is dissolved. The sulubilized urokinase is then dialyzed to eliminate tannic acid and any other impurities which may be present. The solution retained after dialysis is the crude urokinase protein concentrate which is then further treated according to the method of this invention to obtain urokinase in a highly purified and concentrated form.

(I) According to the present invention, the solution of crude urokinase protein concentrate is mixed with cold (about 0° C.) butyl alcohol. The cold butyl alcohol, while leaving the urokinase in solution, denatures the extraneous proteinaceous material which is present, and causes it to gel. This gel rises to the top of the urokinase solution and is easily separated therefrom and is discarded. The urokinase solution is then dialyzed against an aqueous buffer solution such as tris (hydroxymethyl)

aminomethane. Dialysis serves to remove any impurities, such as alkali and salts, which may have formed in the process. After dialysis, the urokinase is in a purified form in aqueous solution.

Although butyl alcohol is particularly suitable and preferred herein, in some instances higher alcohols, such as the C-5 and C-6 alcohols, may be used. Alcohols lower than butyl alcohol will not precipitate the entraneous proteinaceous material in the solution of crude urokinase protein concentrate. The butyl alcohol must be cold to avoid denaturation of the urokinase. Ice bath temperature (about 0° C.) has been found to be quite satisfactory for this purpose.

A sufficient amount of the butyl alcohol to precipitate the extraneous proteinaceous material should be used. Generally such amount is about 15% of the volume of the crude urokinase protein concentrate solution. If desired, a larger quantity of alcohol may be employed depending upon the particular crude urokinase solution to which it is added. Factors such as unnecessary dilution, ease of handling, etc. are, of course, to be taken into consideration.

The urokinase is in a relatively high concentration and sufficiently pure so that it can be brought to highly purified state with relatively little further processing.

(II) The purified urokinase solution, obtained as described above, is then further purified and concentrated by additional selective separation steps. The purified urokinase solution is treated by the addition thereto of dilute acid which precipitates the urokinase together with other extraneous protein out of solution. Any dilute acid, organic or inorganic, that provides a sufficient concentration of free hydrogen ions to cause precipitation will suffice. The precipitate thus formed is a urokinase-extraneous protein mixture.

The urokinase is then separated out of the precipitate mixture by selectively solubilizing it by the addition thereto of cold (about 0° C.) ethyl alcohol and permitting the resulting mixture to remain at about room temperature for a sufficient amount of time until the urokinase is substantially solubilized. This alcoholic solution of urokinase is then separated from any insoluble material present and is then dialyzed to reprecipitate the urokinase in a highly purified form.

The ethyl alcohol is added to the precipitate mixture at ice bath temperature (about 0° C.) in an amount sufficient to solubilize the urokinase. I have found that amounts of alcohol ranging from about ½ to about 3 times the volume of precipitate mixture have been advantageous in solubilizing the urokinase. Generally, the alcoholic urokinase mixture is allowed to remain at room temperature for about three (3) hours but this time period is not critical. It will be readily apparent to those skilled in the art that greater or lesser periods of time will be required for solubilization of the urokinase depending upon the quantity of urokinase which is present in the mixture and the degree of solubilization that it is desired to attain. In addition to its solubilization effect on the precipitate mixture, the alcohol serves the important function of destroying viruses, especially the hepatitis virus, with which the urokinase mixture might be contaminated.

The ethyl alcohol-solubilized urokinase is dialyzed against buffer solution, e.g. tris (hydroxymethyl) aminomethane, which precipitates the urokinase. This urokinase precipitate can be separated and collected by any suitable means such as centrifugation, filtration or the like. The urokinase precipitate is then made soluble by the addition thereto of a sufficient amount of cold (about 0° C.) weak alkali. Sodium hydroxide has been found to be quite effective for this purpose, but it is contemplated that any common alkali solution will be effective, provided the pH of the solution is not allowed to go above about pH 10. The alkali is added to the precipitate until solution is effected, followed by dialysis. This solubilization step is carried out at low temperature to prevent the destruction of the heat labile urokinase.

An alternate method of solubilizing the urokinase precipitate is by the addition thereto of urea. The urea is added to the urokinase precipitate in buffer solution until the precipitate dissolves. After solubilization has been effected, the urea is then dialyzed out of solution.

The following examples illustrate the processes of the invention in more detail.

EXAMPLE I

A crude urokinase protein concentrate, produced from 5 liters of urine, was suspended in an aqueous buffer solution and dissolved by the addition thereto of sodium hydroxide and dialyzed against buffer at about neutral pH. To 100 ml. of the crude urokinase concentrate solution (at about 0° C.) was added 50 ml. of butyl alcohol at about 0° C. The mixture is then centrifuged to collect the precipitated extraneous proteinaceous material which is discarded. The soluble urokinase portion is collected and dialyzed at 4° C. against 2 liters of 0.05 M tris (hydroxymethyl) aminomethane buffer at pH 7.4. The dialyzed material containing the urokinase is in a relatively purified form, i.e., 1,000 CTA units per mg. of protein (a CTA unit is a measure of the activity of urokinase). The crude urokinase protein concentrate, which was used as the starting material, contained only 250 CTA units per mg. of protein.

As stated above, it has been found preferable to employ the butyl alcohol at a temperature of 0° C. in order to avoid any substantial denaturation of the heat labile urokinase. Accordingly, in some instances the temperature of the butyl alcohol may be higher than 0° C. so long as there is no substantial denaturation of the urokinase.

EXAMPLE II

To 100 ml., at about 0° C., of the dialyzed butyl alcohol-treated concentrate (1,000 CTA units per mg. of protein; equivalent to 5 liters of urine) is added 10 ml. of cold 0.1 N HCl which precipitates the urokinase and other proteins. To the precipitated urokinase mixture is added 100 ml. of cold (about 0° C.) absolute ethyl alcohol. This alcoholic urokinase mixture is then removed from the ice and allowed to remain at room temperature for 3 hours to substantially solubilize the urokinase. The mixture is then centrifuged to separate the urokinase from other insoluble material. The insoluble material is discarded and the remaining alcoholic solution of urokinase is dialyzed at 4° against several 2 liter changes of 0.05 M tris (hydroxymethyl) aminomethane buffer at pH 7.4. The dialysis sack contains a precipitate (purified urokinase) which is collected by centrifugation and washed several times with cold buffer. The urokinase precipitate is then suspended in 100 ml. of the buffer and 0.2 N NaOH is added dropwise to effect solution of urokinase. The urokinase solution contains approximately 10,000 CTA units per mg. of protein. Other solvents for the urokinase can be used, such as a urea solution in a neutral buffer at about pH 7.

I claim:
1. A method for purifying a crude urokinase protein precipitate, obtained by the precipitation of urine with tannic acid, which comprises:
 (i) dissolving said urokinase precipitate in an alkaline solution not higher than pH 10 and dialyzing against buffer at about pH 7,
 (ii) mixing the crude urokinase solution with a sufficient amount of cold butyl alcohol to render insoluble the proteinaceous material, other than urokinase, which is present in the crude urokinase solution,
 (iii) separating the soluble urokinase portion from the insoluble protein precipitate and collecting said urokinase portion, and

(iv) dialyzing the soluble urokinase portion against buffer solution to eliminate impurities.

2. A method according to claim 1 in which said butyl alcohol is at about 0° C.

3. A method according to claim 1 in which said alkaline solution is a solution of sodium hydroxide.

4. A method for further purifying the urokinase produced in accordance with claim 1 which comprises:
 (i) adding dilute acid to said urokinase solution to precipitate urokinase and extraneous proteinaceous material therefrom,
 (ii) solubilizing the urokinase by adding cold ethyl alcohol and permitting the solution to remain at about room temperature for a sufficient amount of time to permit the solubilization of the urokinase,
 (iii) separating and collecting the solubilized urokinase,
 (iv) dialyzing the solubilized urokinase against buffer to form a precipitate of urokinase,
 (v) solubilizing the precipitated urokinase by the addition thereto of a solvent.

5. A method according to claim 4 in which said solvent is dilute sodium hydroxide.

6. A method according to claim 4 in which said solvent is a urea solution in a neutral buffer at about pH 7.

References Cited
UNITED STATES PATENTS 2,292,841  8/1942  Necheles _____ 424—99

LIONEL M. SHAPIRO, Primary Examiner

PO-1050
(5/69)

UNITED STATES PATENT OFFICE
CERTIFICATE OF CORRECTION

Patent No. 3,477,911    Dated November 11, 1969

Inventor(s) Nathan H. Sloane

It is certified that error appears in the above-identified patent and that said Letters Patent are hereby corrected as shown below:

| COLUMN | LINE | READS | SHOULD READ |
|---|---|---|---|
| 4 | 51 | 4° | 4°C. |
| 4 | 57 | of urokinase | of the urokinase |

SIGNED AND
SEALED
FEB 17 1970

(SEAL)
Attest:

Edward M. Fletcher, Jr.
Attesting Officer

WILLIAM E. SCHUYLER, JR.
Commissioner of Patents